United States Patent [19]

Mitsumata

[11] Patent Number: 4,865,912
[45] Date of Patent: Sep. 12, 1989

[54] PRECIOUS-WOOD-FACED SHEET FOR DECORATION, BOARD HAVING THE SAME LAMINATED THEREUPON, AND PROCESS OF MANUFACTURE

[75] Inventor: Hiroshi Mitsumata, Nagareyama, Japan

[73] Assignee: Hokusan Kabushiki Kaisha, Tokyo, Japan

[21] Appl. No.: 183,627

[22] Filed: Apr. 19, 1988

Related U.S. Application Data

[63] Continuation-in-part of Ser. No. 883,046, Jul. 8, 1986, abandoned.

[51] Int. Cl.$^4$ .............................................. B32B 27/00
[52] U.S. Cl. ............................... 428/285; 156/244.22;
156/244.24; 156/244.27; 428/286; 428/461;
428/511; 428/512; 428/537.1; 428/537.5
[58] Field of Search ............. 428/285, 286, 461, 511,
428/512, 537.1, 537.5; 156/244.22, 244.24, 244.27

[56] References Cited

U.S. PATENT DOCUMENTS 3,503,831 3/1970 Oyama .................................. 428/285

*Primary Examiner*—Marion C. McCamish
*Attorney, Agent, or Firm*—Oliff & Berridge

[57] ABSTRACT

The decorative sheets and decorative boards of this invention each comprise a laminated structure which includes a first sheet of fibrous material (such as Japanese paper, kraft paper, tissue paper or impregnated paper), a first heat-sealable resinous layer (such as polyethylene or polypropylene), a sheet of metal foil (such as aluminum or iron), a second heat-sealable resinous layer (such as polyethylene or polypropylene) and a second sheet of fibrous material (such as Japanese paper, kraft paper, tissue paper or impregnated paper), with a precious-wood layer bonded to the surface of the laminated structure. For decorative boards, a base material (such as a plywood) is bonded to the back surface of the laminated structure, through an adhesive layer of a cold-curable, thermosetting or thermoplastic resin, by hot pressing, cold pressing or a combination thereof. The decorative sheets and decorative boards preferably are manufactured by a process of melt-extrusion laminating.

55 Claims, 3 Drawing Sheets

PRECIOUS-WOOD-FACED SHEET FOR DECORATION, BOARD HAVING THE SAME LAMINATED THEREUPON, AND PROCESS OF MANUFACTURE

This is a continuation-in-part of U.S. application Ser. No. 883,046, filed July 8, 1986, now abandoned.

BACKGROUND OF THE INVENTION

This invention relates to precious-wood-faced sheets useful for decoration and boards having the same laminated thereupon (hereinafter referred to as decorative sheets and decorative boards). More particularly, it relates to decorative sheets and decorative boards useful as interior materials for houses and buildings (such as wall, ceiling and door facings), and as facing materials for furniture, cabinets, musical instruments and electrical appliances.

Recently, decorative boards using wood veneer as a base material have been used as ceiling and wall facings in houses and buildings, and various decorative sheets have also been used as facings for furniture and cabinets.

When a decorative wall or ceiling of this type is to be face-lifted, it is common practice to peel the bonded decorative board from the wall surface and replace it with a new decorative board. In this case, the veneer base material of the bonded decorative board is likely to break, with part of the broken material being left attached to the substrate. These attached veneer pieces must be removed before setting a new decorative board, making the replacement job rather cumbersome. In addition, the face lifting cost is increased because the total board must be replaced. A simpler and less costly method has also been adopted to avoid these disadvantages. This method involves bonding a new, thin decorative plastic sheet or decorative wall paper directly to the existing surface of a decorative board in use with only the outermost decorative wood veneer being peeled off, if necessary. However, this method also has disadvantages in that the beautiful grain of precious wood (such as Japanese cypress or zelkova) becomes hidden and the newly applied sheet or paper tends to become twisted, contracted or curled afterward, making uniform application over a wide area quite difficult.

Additionally, when using a decorative sheet as a facing of furniture and cabinets, the problem of poor dimensional stability and possible warpage after bonding arises.

Decorative boards composed of a base material, such as a plywood, and of a decorative sheet bonded thereto are commercially available. In this case, too, the poor dimensional stability of decorative sheet often causes defective products because of its elongation and shrinkage due to moisture absorption by the precious-wood veneer and supporting materials used.

SUMMARY OF THE INVENTION

One object of this invention is to improve the poor dimensional stability observed in conventional decorative sheets, thereby preventing the unruly displacement of applied decorative sheets, or decorative boards having decorative sheets bonded thereupon, caused by moisture absorption or drying; to minimize their warpage; and to ensure surface flatness.

A further object of this invention is to provide decorative sheets which can be face-lifted simply and at low cost to give a good finish, and which are sufficiently flexible for application to bent or curved parts.

Another object of this invention is to provide decorative boards having such decorative sheets as described above bonded to the surface of a suitable base material (e.g., plywood).

As a result of studies aimed at developing high-quality decorative sheets free from the disadvantages mentioned above we have found that high dimensional stability can be achieved if a sheet of metal foil (e.g., aluminum or iron foil) is used as a member of the laminate structure, and that this metal foil can be firmly fixed if sandwiched between two layers of heat-sealable resin (e.g., polyethylene) and subjected to fusion bonding. The present invention was accomplished based on these findings.

The precious-wood-faced decorative sheets of this invention comprise a laminated structure which includes a first sheet of fibrous material (e.g., Japanese paper, kraft paper, tissue paper, impregnated paper or nonwoven fabrics), a first heat-sealable resinous layer (e.g., polyethylene or polypropylene), a sheet of metal foil (e.g., aluminum or iron foil), a second heat-sealable resinous layer (e.g., polyethylene or polypropylene) and a second sheet of fibrous material (e.g., Japanese paper, kraft paper, tissue paper, impregnated paper or nonwoven fabrics). The laminated structure further has a precious-wood layer (a precious-wood veneer or a supported precious-wood veneer sheet) bonded to the surface thereof through an adhesive layer of a thermosetting or thermoplastic resin by hot pressing or by a combination of hot pressing and cold pressing.

The decorative boards of this invention comprise a laminated structure as defined above, said laminated structure further having a precious-wood layer (a precious-wood veneer or a supported precious-wood veneer sheet) bonded to the surface thereof through an adhesive layer of a cold-curable, thermosetting or thermoplastic resin, and also having a base material bonded to the back surface thereof through an adhesive layer of a cold-curable, thermosetting or thermoplastic resin, by hot pressing, cold pressing or a combination thereof.

The decorative sheets of this invention employ a layer of metal foil (e.g., aluminum or iron) and heat-sealable resinous layers (e.g., polyethylene or polypropylene) in the laminated structure, and hence have moderate rigidity and flexibility, showing high dimensional stability over the entire sheet. This minimizes elongation occurring when an adhesive is applied to the back surface of the sheet, or elongation caused by moisture absorption of a precious-wood facing. In addition, surface flatness is assured when sheets are applied to a wall even if bonding is locally insufficient.

The presence of metal foil serves to suppress the displacement of wood veneer, thus preventing the formation of surface cracks.

In addition, if a thin sheet of paper is used as a bottom ply, the heat-sealable resin can evenly penetrate over the entire area of the paper, thus preventing it from peeling off.

The decorative sheets of this invention, with the laminated structure subjected to pressing during the manufacturing process, are extremely thin and moderately flexible, and hence can be easily applied directly to the existing surface of an interior material, or to an interior material with its facing removed. This makes interior face-lifting simpler and easier. The sheets also have moderate rigidity and can be uniformly applied over a wide area even on surfaces with some irregularities. In addition, moisture has little effect on the decorative sheets of this invention. Moreover, the sheets of this invention have high dimensional stability, and show little tendency of becoming twisted, contracted and curled after being bonded, thus giving an extremely good finish.

Furthermore, the sheets are moderately soft and can be easily bent as desired, and hence may be applied to bent or curved parts, such as a column. The sheets can be easily cut with a knife into any desired shape. With such ease of fabrication, the decorative sheets of this invention may also be used as facings of furniture, cabinets, fancy boxes and the like. The sheets are also designed to arrest permeation of alkalis and are highly alkali-resistant.

The decorative boards of this invention have similar characteristics, making them excellent building materials.

DESCRIPTION OF THE PREFERRED EMBODIMENTS

The decorative sheets and the decorative boards of this invention are explained in more detail below while referring to the accompanying drawings.

The decorative sheet 1 of this invention shown in FIG. 1 comprises a laminated assembly which includes a precious-wood layer 2 comprising either a precious-wood veneer or a supported precious-wood veneer sheet, an adhesive 3 and a sheet base material 4, said laminated assembly being subjected to a pressing operation as detailed below.

The precious-wood layer 2 may comprise a precious-wood veneer in the form of a thin sheet of a domestic decorative timber (e.g., Japanese cypress, Japanese oak, zelkova, cherry or elm) or an imported decorative timber (e.g., teak, rosewood, walnut, mahogany or zebrawood) produced by peeling or otherwise cutting from a log to a thickness of, for example, 0.15 to 0.60 mm.

As an alternative to the precious-wood veneer, a supported precious-wood veneer sheet may be used as the preciouswood layer 2. As used herein, the terminology "supported precious-wood veneer sheet" means a precious-wood veneer bonded to a sheet of Japanese paper, kraft paper, tissue paper, impregnated paper or a nonwoven fabric through an adhesive layer (the same one as adhesive 3 described below). Bonding is effected by hot pressing or a combination of hot pressing and cold pressing.

The adhesive 3 may be any cold-curable, thermosetting or thermoplastic adhesive formulated for bonding of decorative wood veneers so that it will not bleed to the veneer surface as a result of the pressing operation. Typical examples include polyvinyl acetate, latex (e.g., styrene-butadiene resin), urea resin and aqueous vinylurethane adhesives.

Figure 1:
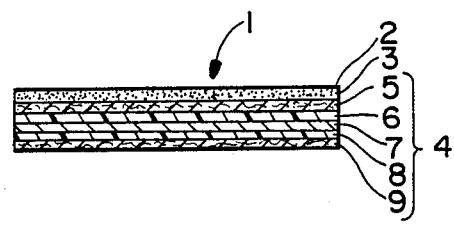
FIG. 1 is a cross-sectional view of the decorative sheet of this invention.

The sheet base material 4 is, as can be seen from FIG. 1, a laminated structure which includes a first sheet of fibrous material 5 (e.g., Japanese paper, kraft paper, tissue paper, impregnated paper or nonwoven fabrics), a first heat-sealable resinous layer 6 (e.g., polyethylene or polypropylene), a sheet of metal foil 7 (e.g., aluminum or iron), a second heat-sealable resinous layer 8 (e.g., polyethylene or polypropylene) and a second sheet of fibrous material 9 (e.g., Japanese paper, kraft paper, tissue paper, impregnated paper or nonwoven fabrics). As used herein, the term "heat-sealable resinous layer" or "heat-sealable resin" means a resinous layer (resin) whose adhesive characteristics are heat activated, and which bonds to adjacent layers upon cooling (i.e., a resinous layer (resin) which heat seals the adjacent layers to one another).

Each of the layers constituting the laminated structure of sheet base material 4 performs an independent function. The first sheet of fibrous material 5 (e.g., Japanese paper, kraft paper, tissue paper, impregnated paper or nonwoven fabrics) serves to prevent the gloss of the metal foil 7 from reaching the surface of the precious-wood veneer or supported precious-wood veneer sheet 2 through the transparent resinous layer 6 (e.g., polyethylene or polypropylene), and also facilitates the bonding between the precious-wood veneer (or supported precious-wood veneer sheet) 2 and the heat-sealable resinous layer 6. The density of the sheet of fibrous material 5 (e.g., Japanese paper, kraft paper, tissue paper, impregnated paper or nonwoven fabrics) should be from 10 to 150 g/m$^2$, preferably in the range from about 20 to about 50 g/m$^2$.

The heat-sealable resinous layer 6 is provided to bond (heat seal) the sheet of fibrous material 5 to the sheet of metal foil 7. The heat-sealable resins utilized should be capable of being melt-extruded satisfactorily. Illustrative examples include high-density or low-density polyethylene (particularly low-density polyethylene), ethylene-acrylic acid copolymer (EAA), ethylene-vinyl acetate copolymer (EVA), ionomer and polypropylene, and two-ply laminates such as polyethylene/EAA may also be used. Of these, polyethylene and EAA are preferable, and EAA is the most preferred. The proper thickness of the resinous layer 6 is in the range from 7 to 150μ, preferably in the range from about 20 to about 40μ.

The sheet of metal foil 7 (e.g., aluminum or iron) with its high rigidity, serves to arrest the elongation and contraction of the precious-wood veneer 2 due to moisture absorption and drying, to prevent crack formation on the surface of decorative sheet 1 and unruly displacement of said sheet, and to minimize warpage of said sheet 1 that might otherwise be encountered when it is bonded to a veneer base material. The metal foil 7 also serves to retard diffusion of moisture. To achieve these results, the thickness of the metal foil 7 should be in the range from 7 to 100μ, preferably in the range from about 15 to about 20μ.

Provision of the second heat-sealable resinous layer 8 along with the first resinous layer 6 (i.e. provision of plural resinous layers) give moderate softness to the decorative sheet 1, and helps prevent alkalis from working into the decorative sheet 1 from the back surface of the laminated structure. This feature is particularly valuable when the wall to which the decorative sheet is to be applied is made of an alkaline substance, such as mortar. The heat-sealable resinous layer 8 is like the heat-sealable resinous layer 6 in that is facilitates bonding between the sheet of metal foil 7 and the sheet of fibrous material 9. Like resinous layer 6, resinous layer 8 should be made of a melt-extrudable resin, and its thickness should be substantially the same as that of the resinous layer 6.

The second sheet of fibrous material 9 (e.g., Japanese paper, kraft paper, tissue paper, impregnated paper or nonwoven fabrics) provided as the bottom layer of the laminated structure 4 is intended to enhance adhesion of the decorative sheet 1 to a substrate material (such as wood veneers or wall material). The density of the fibrous material 9 should be in the range from 10 to 150 g/m$^2$, and is preferably in the range of from about 20 to about 60 g/m$^2$.

Figure 2:
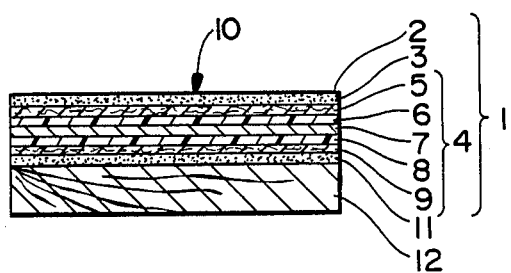
FIG. 2 is a cross-sectional view of the decorative board of this invention.

Next, the decorative board of this invention is explained below. The decorative board 10 of this invention shown in FIG. 2 is composed of the above-described decorative sheet 1 further having a base material 12 (e.g., wood veneer) bonded thereupon, through an adhesive layer 11, by the pressing operation explained below. In FIG. 2, the laminated structure in the decorative sheet 1 is the same as described above in connection with FIG. 1.

The adhesive 11 is preferably a cold-curable, thermosetting or thermoplastic synthetic resin, such as polyvinyl acetate, latex, urea resin or aqueous vinyl-urethane adhesives. For example, polyvinyl acetate, polychloroprene and styrenebutadiene copolymer could be used. The base material 12 may be a cellulosic material (e.g., plywood, fiberboard or paper), a plastic material (e.g., synthetic resin plate or plastic foam), a ceramic material (e.g., calcium silicate board or gypsum board), a metallic material (e.g., aluminum or iron plate) or a composite material. Its thickness may vary widely depending upon the end use of the decorative board 10.

The processes for manufacturing the decorative sheet 1 of this invention and the decorative board 10 having the same bonded thereupon will now be explained.

The decorative sheet may be manufactured by overlaying the precious-wood layer 2 (i.e. either precious-wood veneer or supported precious-wood veneer sheet), through the adhesive layer 3, onto the laminated structure comprising the sheet of fibrous material 5, the heat-sealable resinous layer 6 (e.g., polyethylene or polypropylene), the metal foil 7, the heat-sealable resinous layer 8 and the sheet of fibrous material 9, and pressing the resultant assembly.

Pressing conditions may vary depending on the type of adhesive used. When the adhesive 3 is a thermosetting resin, for example, hot pressing is used to compress the laminated assembly into a thin sheet while curing the adhesive at the same time. This can be accomplished, for example, by pressing at about 100° C. and about 7 kg/cm$^2$ over a period of about 90 seconds.

When the adhesive 3 is a thermoplastic resin, the laminated assembly is compressed into a thin sheet by hot pressing, followed by cold pressing. For instance, hot pressing may be performed at about 125° C. and 7 kg/cm$^2$ for 180 seconds, followed by cold pressing at room temperature or under cooling at the same pressure as above (7 kg/cm$^2$).

Figure 3:
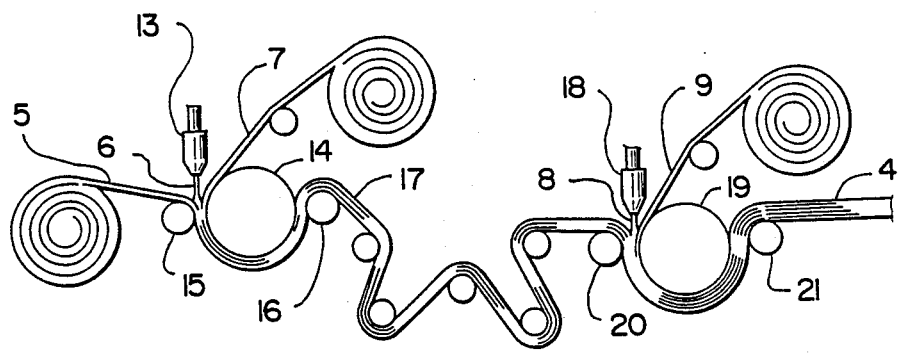
FIG. 3 is a diagrammatic view of a melt-extrusion laminating process utilized to manufacture the 5-ply sheet base material of this invention.
Figure 4:
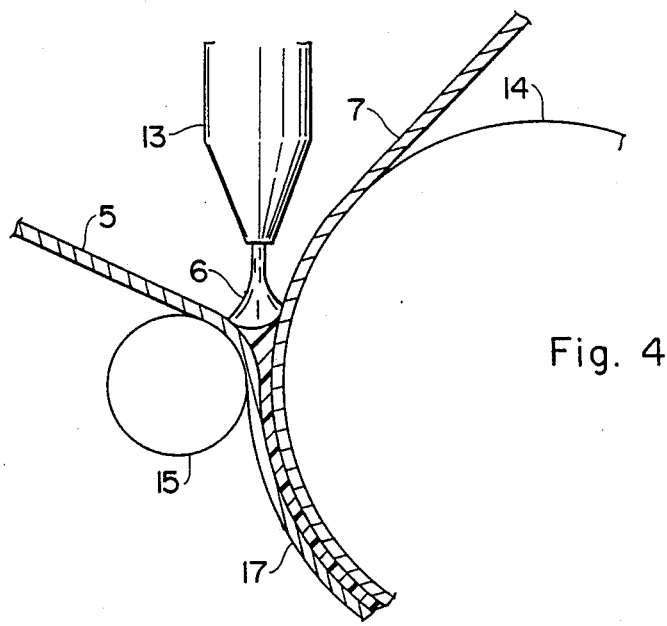
FIG. 4 is a partial enlarged view of the left hand side of FIG. 3.
Figure 5:
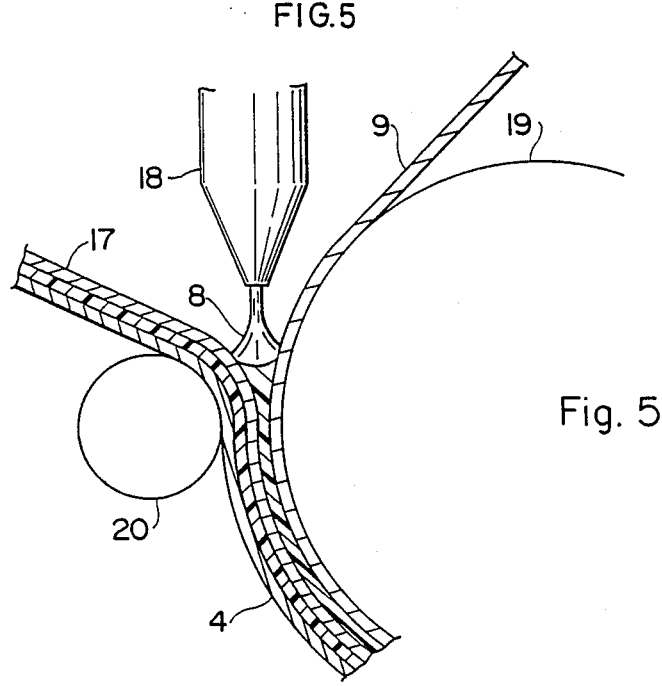
FIG. 5 is a partial enlarged view of the right hand side of FIG. 3.

The heat-sealable resinous layers 6 and 8 preferably are laminated together with the sheets of fibrous material 5 and 9, and the metal foil sheet 7, by melt-extrusion as depicted in FIGS. 3–5. In other words, the resinous layers 6 and 8 are heated to a temperature which both softens or melts them for heat sealing purposes and renders them melt-extrudable. The resinous layer 6 is extruded from an extrusion die 13 directly between the fibrous sheet 5 and metal foil sheet 7, while the fibrous and metal foil sheets 5,7 are being simultaneously fed. The fibrous and metal foil sheets 5,7 and intervening resinous layer 6 are then cooled and pressed (preferably substantially simultaneously) by means of cooling roller 14 and pressure rollers 15,16 to heat seal resinous layer 6 to the fibrous and metal foil sheets 5,7, thereby forming a three-layer laminated structure 17. Consecutively (preferably immediately thereafter), the resinous layer 8 is extruded from an extrusion die 18 directly between the fibrous sheet 9 and the metal foil sheet 7 surface of the three-layer laminated structure 17, while the fibrous sheet 9 and the three-layer laminated structure 17 are being simultaneously fed. The fibrous sheet 9, three-layer laminated structure 17 and intervening resinous layer 8 are then cooled and pressed (preferably substantially simultaneously) by means of cooling roller 19 and pressure rollers 20,21 to heat seal resinous layer 8 to the fibrous sheet 9 and three-layer laminated structure 17, thereby forming the five-ply laminated sheet base material 4 discussed above. This total process is hereinafter identified as melt-extrusion laminating.

Of course, the above preferred process for manufacturing the sheet base material 4 may be modified without departing from the scope of the invention. For example, the apparatus depicted in FIGS. 3–5 may be modified to provide for simultaneous or substantially simultaneous application of resinous layers 6,8 to the fibrous and metal foil sheets 5, 7, 9, in lieu of the consecutive application of resinous layers 6, 8 and the intermediate three-layer laminated structure 17 shown and described. Alternatively, resinous layers 6 and 8 may be heated to a meltextrudable temperature, melt extruded, and cooled to form two relatively hardened resinous sheets. The resinous sheets may then be placed directly between the fibrous and metal foil sheets, reheated for heat sealing purposes, and cooled and pressed along with the fibrous and metal foil sheets to heat seal the resinous layers to the fibrous and metal foil sheets, thereby forming the five-ply, laminated sheet base material 4.

The 5-ply laminated structure thus obtained is then bonded to the precious-wood layer 2 (i.e. either the preciouswood veneer or supported precious-wood veneer sheet) through the adhesive layer 3 by pressing under the aforementioned conditions.

The decorative board 10 of this invention may be manufactured either by overlaying the precious-wood layer 2, through the adhesive layer 3, on the 7-ply laminated structure (5, 6, 7, 8, 11 and 12), or overlaying the decorative sheet 1, through the adhesive layer 11, on the base material (e.g., wood veneer) 12, followed by pressing. As with the decorative sheet, pressing conditions vary depending on the type of adhesive used and are nearly the same as above.

An illustrative example for aiding in the manufacture of the decorative sheet and decorative board of this invention is described below, but this is not intended to limit the scope of this invention.

EXAMPLE

Decorative sheet, and decorative board having the same laminated thereupon.

The following materials were used as the components of the laminated structure shown in the decorative sheet and decorative board of FIGS. 1 and 2.

| | |
|---|---|
| Precious-wood veneer 2: | 0.22 mm thick veneer of birch, and 0.28 mm thick veneer of Japanese oak |
| Adhesive 3: | Thermosetting adhesive of styrene-butadiene copolymer type |
| Fibrous Material 5: | Pure-white, machine glazed paper (density: 30 g/m²) |
| Resinous layer 6: | 40μ thick EAA or polyethylene |
| Metal foil 7: | 15μ thick aluminum foil |
| Resinous layer 8: | 40μ thick EAA or polyethylene |
| Fibrous Material 9: | Pure-white, machine glazed paper (density: 30 g/m²) |
| Adhesive 11: | Polyvinyl acetate adhesive |
| Base material 12: | 4 mm thick, ordinary plywood |

A laminated structure of paper 5/resinous layer 6/metal foil 7/resinous layer 8/paper 9 was first made by melt-extrusion laminating. This was then coated with the adhesive 3, the precious-wood veneer 2 was placed on the adhesive layer, and the total assembly was pressed at 100° C. and 7 kg/cm² for 90 seconds, giving the decorative sheet 1.

A decorative board was made by coating the adhesive 11 on the surface of the base material 12, placing the decorative sheet 1 obtained above on the adhesive layer, and pressing the total assembly at 100° C. and 7 kg/cm² for 90 seconds. The decorative board thus obtained was polished at its precious-wood veneer face, and the polished surface was protected with a polyurethane coating.

Resistance to cracking of the decorative board obtained above was tested as described below.

A control sample (hereinafter referred to as a "blank" sample), composed of a precious-wood veneer and plywood laminate, was made by using a precious-wood veneer, taken from a part of a log in the vicinity of the area from which the veneer of the test sample had been cut, and a plywood made of veneers taken from adjacent areas. These were bonded together through the adhesive 11 under a hot-pressing condition of 105° C. and 7 kg/cm² for 90 seconds.

The test was conducted according to the method specified in JAS (Japanese Agricultural Standards)—thermal cycle test B for decorative plywoods.

Two blank and two test specimens, each 150 mm×150 mm, were made for the test. The specimens were allowed to stand for two hours in a thermostat chamber controlled at 80±3° C. and then for two hours in another thermostat chamber controlled at −20±3° C. This thermal cycle was repeated four times and crack formation on each specimen was observed.

Straight lines of 1 cm intervals were drawn lengthwise and crosswise on each tested specimen (like a checkerboard) to make 225 (=15×15) seconds 1 cm square, the number of cracks in each section was counted, and the total number of cracks formed on each specimen was determined. A crack which extended over a plurality of sections was counted as one in which of those sections.

The result of the test is shown in the table below:

| Specimen Wood | Blank | | Board of this invention | |
|---|---|---|---|---|
| Birch | 57 | Av. | 0 | |
| | 28 | 43 | 0 | 0 |
| Japanese oak | 29 | Av. | 0 | |
| | 25 | 27 | 0 | 0 |

As is apparent from the table, no crack was formed on the decorative board of this invention which contains, in its laminated structure, paper and metal foil layers.

What is claimed is:

1. A precious-wood-faced decorative structure formed as a sheet consisting of:
   a laminated structure consisting of a first sheet of fibrous material, a first heat-sealable resinous layer, a sheet of metal foil, a second heat-sealable resinous layer, and a second sheet of fibrous material, each of said first and second resinous layers comprising a material selected from the group consisting of high-density polyethylene, low-density polyethylene, ethylene-acrylic acid copolymer (EAA), ethylene-vinyl acetate copolymer (EVA), ionomer, polypropylene and two-ply laminates such as polyethylene/ethylene-acrylic acid copolymer (EAA); and
   a precious-wood layer bonded to a surface of the laminated structure through an adhesive layer.

2. The precious-wood-faced decorative structure of claim 1, wherein said precious-wood layer comprises a precious-wood veneer sheet bonded to and supported by impregnated paper.

3. The precious-wood-faced decorative structure of claim 1, wherein said precious-wood layer comprises a precious-wood veneer sheet bonded to and supported by impregnated paper, and each of said first and second resinous layers comprises a two-ply laminate of ethylene-acrylic acid copolymer (EAA) and low-density polyethylene.

4. The precious-wood-faced decorative structure of claim 3, wherein said two-ply laminate of each of said first and second resinous layers is disposed with said ethylene-acrylic acid copolymer (EAA) adjacent said metal foil sheet and said low-density polyethylene adjacent one of said first and second fibrous material sheets.

5. The precious-wood-faced decorative structure of claim 1, wherein said precious-wood layer is bonded to said surface of the laminated structure through an adhesive selected from the group consisting of cold curable resin, thermosetting resin and thermoplastic resin.

6. The precious-wood-faced decorative structure of claim 1, wherein each of said first and second sheets of fibrous material is made of a material selected from the group consisting of Japanese paper, kraft paper, tissue paper, impregnated paper and nonwoven fabrics.

7. The precious-wood-faced decorative structure of claim 6, wherein the density of said fibrous material is between 10 and 150 g/m².

8. The precious-wood-faced decorative structure of claim 6, wherein the thickness of said metal foil is between 7 and 100μ.

9. The precious-wood-faced decorative structure of claim 1, wherein said metal foil is aluminum foil.

10. The precious-wood-faced decorative structure of claim 1, wherein said metal foil is iron foil.

11. The precious-wood-faced decorative structure of claim 1, wherein said adhesive layer is of a thermosetting type and the entire decorative structure is subjected to hot pressing.

12. The precious-wood-faced decorative structure of claim 1, wherein said adhesive layer is of a thermoplastic type and the entire decorative structure is subjected to hot pressing, followed by cold pressing.

13. The precious-wood-faced decorative structure of claim 1, wherein the thickness of each of said heat-sealable resinous layer is between 7 and 150μ.

14. The precious-wood-faced decorative structure of claim 1, wherein said laminated structure consists of a first sheet of machine glazed paper, a first layer of at least one of ethylene-acrylic acid copolymer (EAA) and polyethylene, a sheet of aluminum foil, a second layer of at least one of ethylene-acrylic acid copolymer (EAA) and polyethylene, and a second sheet of machine glazed paper, laminated in that order, and wherein said precious-wood layer is bonded, through a polyvinyl acetate adhesive layer, to the laminated structure by pressing.

15. A precious-wood-faced decorative structure formed as a board consisting of:
 a laminated structure consisting of a first sheet of fibrous material, a first heat-sealable resinous layer, a sheet of metal foil, a second heat-sealable resinous layer and a second sheet of fibrous material, each of said first and second resinous layers comprising a material selected from the group consisting of high-density polyethylene, low-density polyethylene, ethylene-acrylic acid copolymer (EAA), ethylene-vinyl acetate copolymer (EVA), ionomer, polypropylene and two-ply laminates such as polyethylene/ethylene-acrylic acid copolymer (EAA);
 a precious-wood layer bonded to a first surface of the laminated structure through a first adhesive layer; and
 a base material bonded to a second surface of the laminated structure through a second adhesive layer.

16. The precious-wood-faced decorative structure of claim 15, wherein said precious-wood layer comprises a precious-wood veneer sheet bonded to and supported by impregnated paper.

17. The precious-wood-faced decorative structure of claim 15, wherein said precious-wood layer comprises a precious-wood veneer sheet bonded to and supported by impregnated paper, and each of said first and second resinous layers comprises a two-ply laminate of and low-density polyethylene.

18. The precious-wood-faced decorative structure of claim 17, wherein said two-ply laminate of each of said first and second resinous layers is disposed with said ethylene-acrylic acid copolymer (EAA) adjacent said metal foil sheet and said low-density polyethylene adjacent one of said first and second fibrous material sheets.

19. The precious-wood-faced decorative structure of claim 15, wherein said precious-wood layer and said base material are respectively bonded to said first and second surfaces of the laminated structure through an adhesive selected from the group consisting of cold curable resin, thermosetting resin and thermoplastic resin.

20. The precious-wood-faced decorative structure of claim 15, wherein each of said first and second sheets of fibrous material is made of a material selected from the group consisting of Japanese paper, kraft paper, tissue paper, impregnated paper and nonwoven fabrics.

21. The precious-wood-faced decorative structure of claim 15, wherein both said precious-wood layer and said base material are bonded, through polyvinyl acetate adhesive layers, to the laminated structure by pressing.

22. A process for manufacturing a precious-wood-faced decorative structure formed as a sheet which comprises the steps of:
 melt extruding first and second heat-sealable resinous layers each comprising low-density polyethylene and ethylene-acrylic acid copolymer (EAA), so as to position them directly between a first sheet of fibrous material and a sheet of metal foil, respectively;
 bonding a precious-wood layer to at least one surface of said laminated structure by means of an adhesive layer to form a laminated assembly; and
 hot-pressing the entire laminated assembly and continuously cooling the entire laminated assembly under the same pressure.

23. A process as defined in claim 22, wherein the precious-wood layer is bonded to the laminated structure by means of an adhesive selected from the group consisting of cold curable resin, thermosetting resin and thermoplastic resin.

24. A process as defined in claim 23, wherein both a precious-wood veneer and a base material are respectively bonded, by means of polyvinyl acetate adhesive layers, to top and bottom surfaces of said laminated structure by pressing.

25. A product produced by the process of claim 24.

26. A product produced by the process of claim 23.

27. A process as defined in claim 25, wherein each of the first and second sheets of fibrous material is made of a material selected from the group consisting of Japanese paper, kraft paper, tissue paper, impregnated paper and nonwoven fabrics.

28. A process as defined in claim 27, wherein the density of the fibrous material is between 10 and 150 g/m².

29. A product produced by the process of claim 28.

30. A process as defined in claim 27, wherein the thickness of said metal foil is between 7 and 100μ.

31. A product produced by the process of claim 30.

32. A product produced by the process of claim 27.

33. A process as defined in claim 22, wherein the metal foil in said laminated structure is aluminum foil.

34. A product produced by the process of claim 33.

35. A process as defined in claim 22, wherein the metal foil in said laminated structure is iron foil.

36. A product produced by the process of claim 35.

37. A process as defined in claim 22, wherein the adhesive layer is of a thermosetting type and the entire laminated assembly is subjected to hot pressing.

38. A product produced by the process of claim 37.

39. A process as defined in claim 22, wherein the adhesive layer is of a thermoplastic type and the entire laminated assembly is subjected to hot pressing, followed by cold pressing.

40. A product produced by the process of claim 39.

41. A process as defined in claim 22, wherein the thickness of each heat-sealable resinous layer is between 7 and 150μ.

42. A product produced by the process of claim 41.

43. A product produced by the process of claim 22.

44. A process for manufacturing a precious-wood-faced decorative structure formed as a board which comprises the steps of:

melt extruding first and second heat-sealable resinous layers each comprising low-density polyethylene and ethylene-acrylic acid copolymer (EAA), so as to position them directly between a first sheet of fibrous material and a sheet of metal foil and a second sheet of fibrous material and the sheet of metal foil, respectively;

bonding a precious-wood layer to a top surface of said laminated structure, and a base material to a bottom surface of said laminated structure, by means of adhesive layers to form a laminated assembly; and hot-pressing the entire laminated assembly and continuously cooling the entire laminated assembly under the same pressure.

45. A process as defined in claim 44, wherein the precious-wood layer and the base material are bonded to the laminated structure by means of an adhesive selected from the group consisting of cold curable resin, thermosetting resin and thermoplastic resin.

46. A product produced by the process of claim 45.

47. A process as defined in claim 44, wherein each of the first and second sheets of fibrous material is made of a material selected from the group consisting of Japanese paper, kraft paper, tissue paper, impregnated paper and nonwoven fabrics.

48. A product produced by the process of claim 47.

49. A product produced by the process of claim 44.

50. A process for manufacturing a precious-wood-faced decorative structure which comprises the steps of:

melt extruding first and second heat-sealable resinous layers each comprising low-density polyethylene and ethylene-acrylic acid copolymer (EAA), so as to position said layers directly between a first sheet of machine glazed paper and a layer of aluminum foil and a second sheet of machine glazed paper and said layer of aluminum foil, respectively;

bonding a precious-wood veneer to at least one surface of said laminated structure by means of a polyvinyl acetate adhesive layer; and hot-pressing the entire laminated assembly and continuously cooling the entire laminated assembly under the same pressure.

51. A product produced by the process of claim 50.

52. A process for manufacturing a precious-wood-faced decorative structure which comprises the following steps of:

(a) heating first and second heat-sealable resinous layers comprising low-density polyethylene and ethylene-acrylic acid copolymer (EAA) to a temperature which both activates their adhesive characteristics and renders them melt-extrudable;

(b) melt extruding the first heat-sealable resinous layer directly between a first sheet of fibrous material and a sheet of metal foil, while the first fibrous sheet and the metal foil sheet are being simultaneously fed;

(c) cooling and pressing the fibrous sheet, the metal foil sheet and the intervening first resinous layer to heat seal the first resinous layer to the first fibrous sheet and the metal foil sheet, thereby forming a three-layer laminated structure;

(d) melt extruding the second heat-sealable resinous layer directly between a second sheet of fibrous material and a the metal foil sheet surface of said three-layer laminated structure while the second fibrous sheet and said three-layer laminated structure are being simultaneously fed;

(e) bonding a precious-wood layer to at least one surface of said laminated structure by means of an adhesive layer to form a laminated assembly; and (f) hot-pressing the entire laminated assembly and continuously cooling the entire laminated assembly under the same pressure.

53. A product produced by the process of claim 52.

54. A process for manufacturing a precious-wood-faced decorative structure which comprises the following steps of:

(a) heating first and second heat-sealable resinous layers comprising low-density polyethylene and ethylene-acrylic acid copolymer (EAA) to a temperature which both activates their adhesive characteristics and renders them melt-extrudable;

(b) melt extruding the first and second heatsealable resinous layers directly between a first sheet of fibrous material and a sheet of metal foil and a second sheet of fibrous material and the sheet of metal foil, respectively, while the fibrous and metal foil sheets are being simultaneously fed to form a laminated structure;

(c) bonding a precious-wood layer to at least one surface of said laminated structure by means of an adhesive layer to form a laminated assembly; and (d) hot-pressing the entire laminated assembly and continuously cooling the entire laminated assembly under the same pressure.

55. A product produced by the process of claim 54.

* * * * *